L. L. CRABTREE & T. C. RIPLEY.
METALLIC CROSS ARM.
APPLICATION FILED JUNE 21, 1915.
Reissued Jan. 4, 1916.
14,040.
2 SHEETS—SHEET 1.
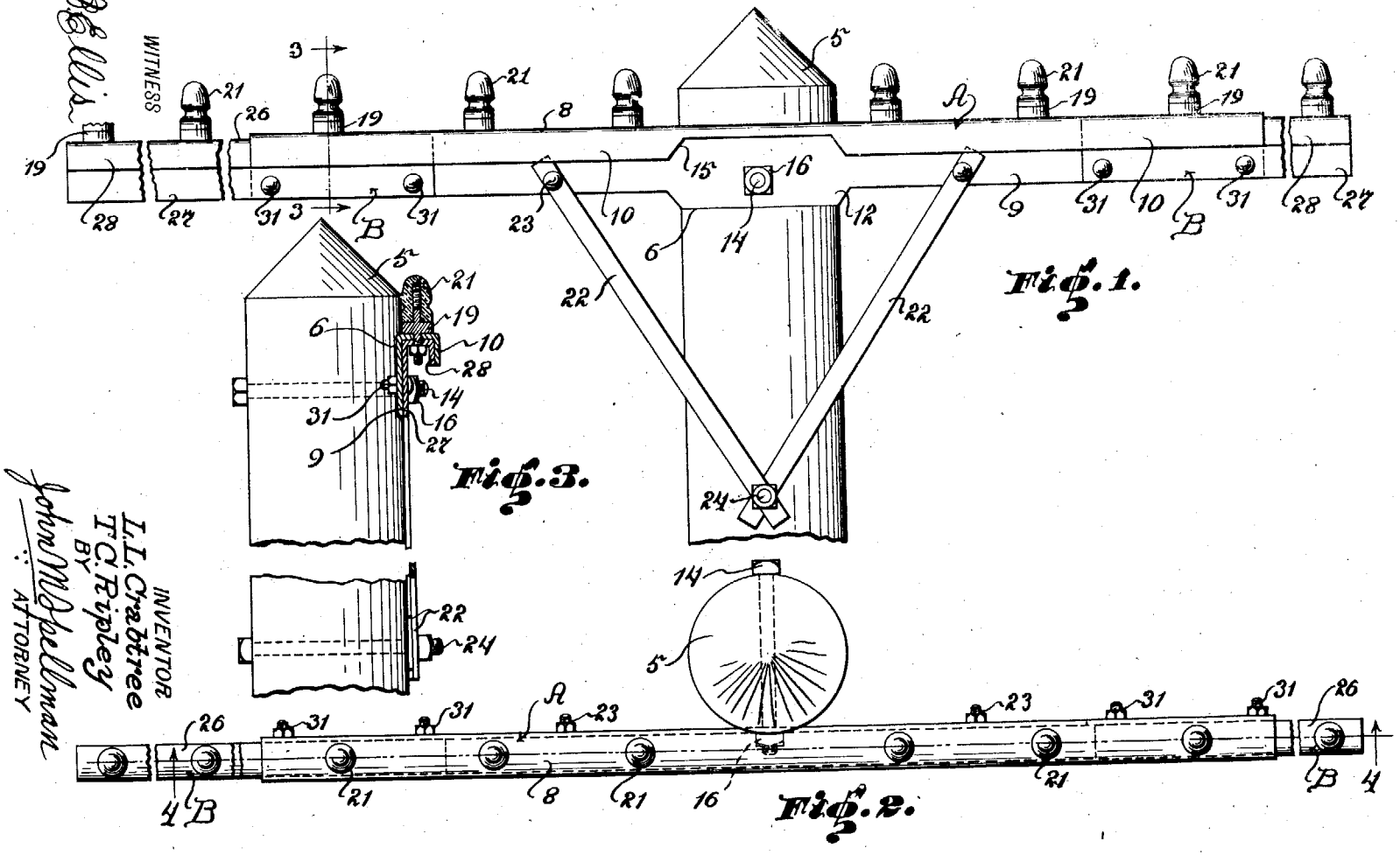
WITNESS
C. A. Ellis
INVENTOR
L. L. Crabtree
T. C. Ripley
BY
John M. Spellman
ATTORNEY

L. L. CRABTREE & T. C. RIPLEY.

METALLIC CROSS ARM.

APPLICATION FILED JUNE 21, 1915.

Reissued Jan. 4, 1916.

14,040.

2 SHEETS—SHEET 2.

WITNESS

C. A. Ellis

INVENTOR

L. L. Crabtree

T. C. Ripley

BY

John M. Spellman

ATTORNEY

UNITED STATES PATENT OFFICE.

LAWRENCE L. CRABTREE AND T CHARLEY RIPLEY, OF SULPHUR SPRINGS, TEXAS.

METALLIC CROSS-ARM.

14,040. Specification of Reissued Letters Patent. Reissued Jan. 4, 1916.

Original No. 1,047,176, dated December 17, 1912, Serial No. 678,167. Application for reissue filed June 21, 1915. Serial No. 35,425.

*To all whom it may concern:*

Be it known that we, LAWRENCE L. CRABTREE and T CHARLEY RIPLEY, citizens of the United States, residing at Sulphur Springs, in the county of Hopkins and State of Texas, have invented certain new and useful Improvements in Metallic Cross-Arms, of which the following is a specification.

This invention relates to improvements in cross-arms for telegraph and telephone poles.

The principal object of the invention is to provide a cross-arm formed of a single strip of metal and having a depending rear wall for direct attachment, tangentially, to the pole and a top wall for the support of the insulators, said top wall projecting beyond the periphery of the pole.

A second object of the invention is to provide in conjunction with such a metallic cross-arm, a pair of extension arms detachably connected to and supported by the cross-arm.

A further object is to provide in conjunction with a cross-arm formed of a single strip of metal having a rear wall for direct attachment, tangentially, to the pole, and a top wall for the support of the insulators, of a front lip extending downwardly from the top wall to reinforce the cross-arm, and a lip downwardly projecting from the rear wall to provide additional means for securing the cross-arm directly to the pole, the front lip being recessed or cut away at a point to register with the downwardly projecting attaching lip of said rear wall.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction within the scope of the claims, may be resorted to without departing from the spirit or sacrificing any of the advantages of the invention.

Figure 4:
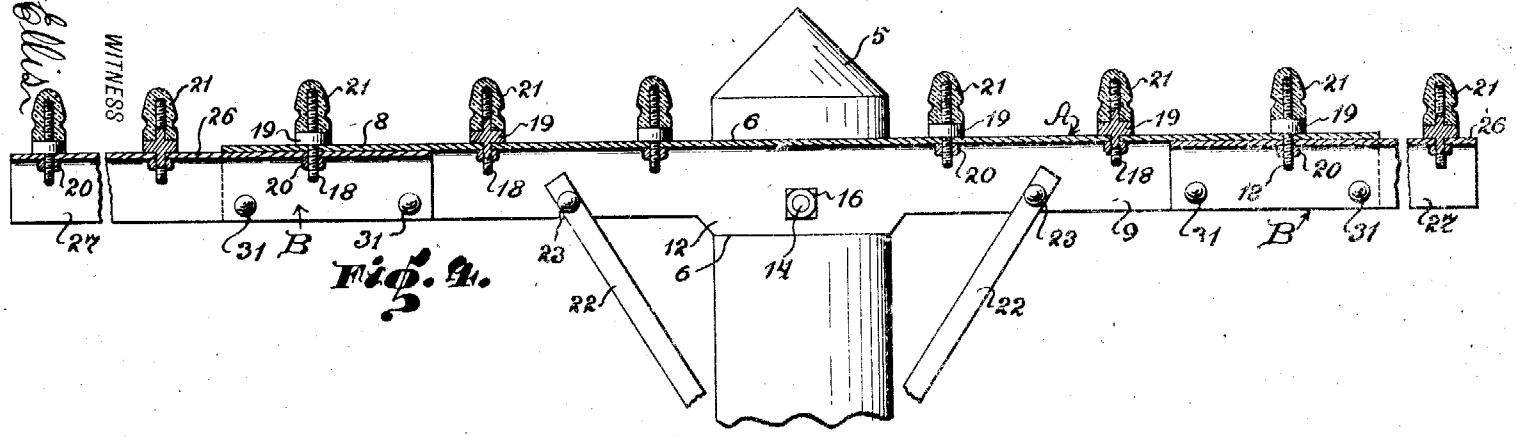
Figure 5:
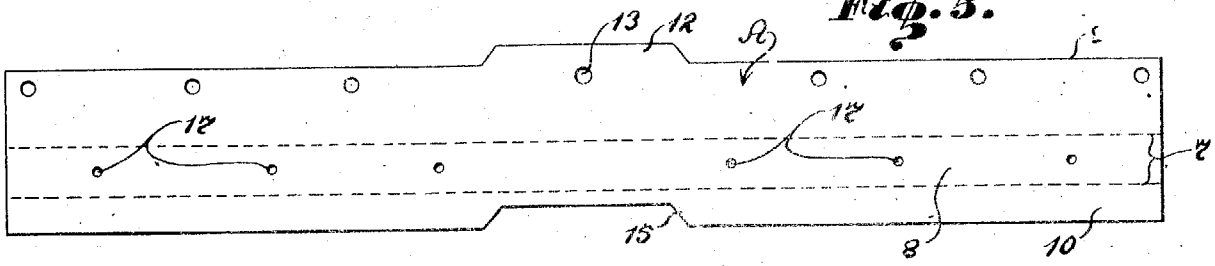
Figure 6:
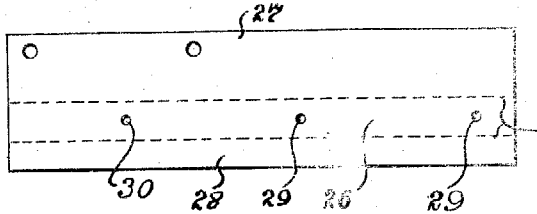

In the drawings: Figure 1 is a detail front elevation showing the application of our invention; Fig. 2 is a top plan view thereof; Fig. 3 is a detail sectional view taken on the line 3, 3 of Fig. 1; Fig. 4 is a longitudinal sectional view taken on the line 4, 4 of Fig. 2; Fig. 5 is a plan view of the preferred form of blank from which the main cross-arm is constructed, and Fig. 6 is a plan view of the preferred form of the blank from which one of the extension arms is constructed.

Like reference numerals designate corresponding parts in all the figures of the drawings.

Referring to the drawings, there is shown a telegraph pole 5 of any suitable construction having a recess 6 formed therein for receiving our improved cross-arm. This cross-arm comprises a main arm A attached directly to the pole 5 and tangentially thereof and extension arms B, B, all of said arms being formed from sheet metal.

The main arm A is formed preferably from a blank of sheet metal, as shown in Fig. 5 of the drawings. This blank is folded longitudinally upon the dotted lines 7, 7 to form a resultant top 8, a rear wall 9 and, if required, a depending longitudinal lip 10. The rear wall 9 is centrally formed, preferably, with a depending lip or enlarged portion 12, and formed in this lip is an opening 13 through which an attaching bolt 14 is adapted to be inserted, said bolt being disposed within a suitable opening formed in the pole 5. Centrally formed in the longitudinal lip 10 and registering with the depending lip 12 is a cut-away portion 15 for facilitating the attachment or removal of the nut 16 upon the bolt 14. Formed in the top 8 and at either end thereof, is a plurality of spaced openings 17, and projecting downwardly into each of said openings is a threaded end of an insulating pin 18, each pin being formed with an integral collar 19 for limiting the downward movement thereof. Nuts 20 are disposed below the top 8, and are respectively connected to the threaded ends of said pin for fixedly securing the same to the arm. Insulators 21 of any suitable type are mounted upon the upper ends of said pins. Braces 22, 22 are each connected to the rear wall 9 on opposite sides of the center thereof by means of bolts 23 or other suitable fastening means. The free ends of these braces are brought together in overlapping relation, and are secured to the pole 5 by means of a bolt 24. Each extension arm B is likewise formed from a blank of sheet metal which is bent longitudinally upon the dotted lines 25, 25 to form a resultant top 26, a rear wall 27 and, if required, a depending longitudinal lip 28. These extension arms B are each of such a size as to be readily disposed within a respective end of the main arm A. The top 26 is formed with a plurality of spaced outer openings 29, 29 and an inner opening 30, the latter registering with the respective outer opening of the arm A for receiving the outer insulating pin of said arm. It will thus be observed that the outer insulating pins serve to connect the extension arms B to the main arm A. Insulating pins similar in construction to those carried by the main arm A are associated with the openings 29 of the extension arms B. In order to more effectively secure the extension arms B to the main arm A, bolts 31 are passed through suitable openings formed in the rear walls of the main arm A and extension arms B, as will be readily understood.

From the foregoing, it will be observed that the main arm A may be used without the extensions, or either one or both of the extensions may be used wtih the main arm. Such an adjustment is found to be advantageous especially where the longer arm is necessary in order to accommodate additional wires.

It will be understood that in use the cross arm is arranged so that the rear wall 9 projects substantially tangentially of the pole 5 and the top wall or ledge 8 projects therefrom beyond the periphery of the pole.

What we claim is:

1. A cross-arm of the character described formed with a top portion adapted to support insulators, a rear wall, and a front reinforcing lip, the rear wall being of a depth to extend below the top and lip portions, substantially as described.

2. A cross-arm formed from a blank of sheet metal bent longitudinally to form a top, rear wall and a downwardly extending front lip, the wall being centrally formed with a downwardly projecting attaching lip and the front lip being cut away at a point in register with the attaching lip.

3. A cross arm comprising in combination, a main arm forming in cross section a U-shaped structure, a correspondingly shaped extension arm interfitted with one end of the main arm, one of the sides of the main arm and the corresponding side of the extension arm depending below the other sides of the main and extension arms, and fastening means for the arms extending through the depending portions thereof.

4. A cross-arm of the character described formed with a top portion adapted to support insulators, a rear wall, and a front downwardly extending reinforcing lip, the rear wall being of a depth to extend below the top and lip portions, substantially as described.

5. A cross-arm of the character described formed with a top portion adapted to support insulators, a rear portion, and a downwardly extending forward lip, said lip being cut away at a point in front of and along the lower edge of the rear wall to expose the latter through the cutaway portion, substantially as described.

6. A cross-arm of the character described formed of a top portion adapted to support insulators, a rear wall, and a downwardly extending forward lip, the rear wall having a part located downwardly below the forward lip, substantially as described.

7. The combination with a cross-arm of hollow formation, of an extension-arm interfitted therewith, and means for securing the cross-arm and the extension-arm together, adjacent attaching walls of the hollow cross-arm and the extension-arm depending below the forward portion of the hollow cross-arm to render the securing means accessible, substantially as described.

LAWRENCE L. CRABTREE.
T CHARLEY RIPLEY.